United States Patent
Osborne

(10) Patent No.: US 12,192,055 B2
(45) Date of Patent: *Jan. 7, 2025

(54) SOFTWARE DEFINED NETWORKING PORTAL FOR CUSTOM-DEFINED NETWORK ROUTING

(71) Applicant: Level 3 Communications, LLC, Broomfield, CO (US)

(72) Inventor: Eric Osborne, Sutton, MA (US)

(73) Assignee: Level 3 Communications, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/403,968

(22) Filed: Jan. 4, 2024

(65) Prior Publication Data

US 2024/0146609 A1 May 2, 2024

Related U.S. Application Data

(63) Continuation of application No. 17/951,600, filed on Sep. 23, 2022, now Pat. No. 11,870,652, which is a
(Continued)

(51) Int. Cl.
*H04L 41/0893* (2022.01)
*H04L 41/0895* (2022.01)
*H04L 41/18* (2022.01)
*H04L 41/40* (2022.01)
*H04L 45/02* (2022.01)
(Continued)

(52) U.S. Cl.
CPC .......... *H04L 41/0893* (2013.01); *H04L 41/18* (2013.01); *H04L 45/02* (2013.01); *H04L 45/64* (2013.01); *H04L 67/02* (2013.01)

(58) Field of Classification Search
CPC ..... H04L 41/0893; H04L 41/18; H04L 45/02; H04L 45/64; H04L 67/02; H04L 41/0895; H04L 41/40
See application file for complete search history.

(56) References Cited

U.S. PATENT DOCUMENTS 8,239,572 B1   8/2012  Brandwine et al.
8,693,344 B1 * 4/2014  Adams .................. H04L 41/342
                                                         370/912

(Continued)

OTHER PUBLICATIONS

European Examination Report, dated Dec. 10, 2018, Application No. 15833493.8, filed Aug. 19, 2015; 6 pgs.
(Continued)

*Primary Examiner* — Harry H Kim

(57) ABSTRACT

Implementations described and claimed herein provide systems and methods for custom-defined network routing. In one implementation, a set of custom defined network flow rules is received at an edge router of a primary network, which is in communication with a customer network. The set of custom defined network flow rules correspond to network traffic associated with the customer network. The set of custom defined network flow rules is stored in a forwarding table on the edge router. A packet of data is received at the edge router. The packet of data is attributed to the customer network. The set of custom defined network flow rules is applied to the pack of data using the forwarding table.

6 Claims, 5 Drawing Sheets

Related U.S. Application Data continuation of application No. 17/082,115, filed on Oct. 28, 2020, now Pat. No. 11,456,922, which is a continuation of application No. 16/371,923, filed on Apr. 1, 2019, now Pat. No. 10,826,774, which is a continuation of application No. 14/830,189, filed on Aug. 19, 2015, now Pat. No. 10,250,442.

(60) Provisional application No. 62/040,856, filed on Aug. 22, 2014.

(51) Int. Cl.
*H04L 45/64* (2022.01)
*H04L 67/02* (2022.01)

(56) References Cited

U.S. PATENT DOCUMENTS

| | | | |
|---|---|---|---|
| 8,799,451 B2* | 8/2014 | Raleigh | H04L 41/0806 709/239 |
| 10,250,442 B2 | 4/2019 | Osborne | |
| 10,826,774 B2 | 11/2020 | Osborne | |
| 11,456,922 B2 | 9/2022 | Osborne | |
| 2007/0121486 A1 | 5/2007 | Guichard et al. | |
| 2007/0168475 A1 | 7/2007 | Mullahy et al. | |
| 2008/0219268 A1 | 9/2008 | Dennison | |
| 2010/0054241 A1 | 3/2010 | Shah | |
| 2010/0284403 A1 | 11/2010 | Scudder | |
| 2013/0120209 A1 | 5/2013 | Padmanabhan et al. | |
| 2013/0250770 A1 | 9/2013 | Zou et al. | |
| 2013/0287026 A1 | 10/2013 | Davie | |
| 2014/0079070 A1* | 3/2014 | Sonoda | H04L 45/74 370/392 |
| 2014/0195666 A1 | 7/2014 | Dumitriu et al. | |
| 2015/0064677 A1 | 3/2015 | Baphna | |
| 2015/0111528 A1* | 4/2015 | Raleigh | H04W 12/08 370/252 |
| 2015/0382197 A1 | 12/2015 | Ren | |
| 2016/0057015 A1 | 2/2016 | Osborne | |
| 2017/0295103 A1* | 10/2017 | Starsinic | H04W 28/12 |
| 2020/0195509 A1 | 6/2020 | Singh | |
| 2021/0044483 A1 | 2/2021 | Osborne | |
| 2023/0016270 A1 | 1/2023 | Osborne | |
| 2023/0328805 A1* | 10/2023 | Pancorbo Marcos | H04L 65/1069 455/422.1 |
| 2023/0412457 A1* | 12/2023 | Wang | H04L 41/12 |

OTHER PUBLICATIONS

European Examination Report, dated Feb. 24, 2020, Application No. 15833493.8, filed Aug. 19, 2015; 4 pgs.

Extended European Search Report, dated Mar. 8, 2018, Application No. 15833493.8, filed Aug. 19, 2015; 10 pgs.

International Preliminary Report on Patentability, dated Feb. 28, 2017, Int'l Appl. No. PCT/US15/045871, Int'l Filing Date Aug. 19, 2015; 8 pgs.

International Search Report dated Nov. 3, 2015, Int'l Appl. No. PCT/US15/45871, Int'l Filing Date Aug. 19, 2015; 3 pgs.

Written Opinion of the International Searching Authority dated Nov. 3, 2015, Int'l Appl. No. PCT/US15/45871, Int'l Filing Date Aug. 19, 2015; 6 pgs.

Bernardos, Carlos J. et al., "An Architecture for Software Defined Wireless Networking", *IEEE Wireless Communications* IEEE Service Center, Piscataway, NJ, US, vol. 21, No. 3; XP011552462 Jun. 1, 2014, pp. 52-61.

* cited by examiner

SOFTWARE DEFINED NETWORKING PORTAL FOR CUSTOM-DEFINED NETWORK ROUTING

TECHNICAL FIELD

Aspects of the present disclosure relate to software defined networking and in particular to a customer portal for custom defining policy routing in a telecommunications network.

BACKGROUND

Telecommunication networks provide for the transmission of information across some distance through terrestrial, wireless, and satellite communication networks. Such communications may involve voice, data, or multimedia information, among others. Typically, a user of the telecommunications network utilizes a communication device, such as a phone or computer, to transmit and receive one or more communications to and from another user of the network. Thus, the network provides any number of components interconnected in such a manner as to facilitate the transmission of communications between two or more users of the network. Stated differently, telecommunication networks comprise nodes, such as routers, switches, gateways, and other network components for transporting information.

As telecommunication networks and the interconnection of network nodes become increasingly complex, software-defined networking (SDN) architectures are deployed for simplifying network management and modification. Generally, network nodes provide data-forwarding functionality and management functionality. Stated differently, network nodes include management functionality for selecting a destination to send network traffic and data-forwarding functionality for forwarding the network traffic to the selected destination. SDN provides more flexibility to networks by decoupling a control plane (i.e., resource, routing, and other network management functionality) from a data plane (i.e., data-forwarding functionality) enabling network control to become directly programmable and the underlying infrastructure to be abstracted from applications and network services.

Generally, telecommunication providers are in communication with one or more customer networks to provide telecommunication services to users. While each of the customer networks may employ SDN to improve customization, optimization, and performance of the customer network by modifying forwarding policies for network traffic through the customer network, such modified forwarding policies are not applied to the telecommunication provider. As such, telecommunication providers often carry network traffic across their networks only to have the traffic discarded or modified once the traffic egresses from the telecommunication provider network into the customer network.

It is with these observations in mind, among others, that various aspects of the present disclosure were conceived and developed.

SUMMARY

Implementations described address the foregoing problems, among others, by providing systems and methods for custom-defined routing in a telecommunications network. In one implementation, a set of custom defined network flow rules is received at an edge router of a primary network, which is in communication with a customer network. The set of custom defined network flow rules correspond to network traffic associated with the customer network. The set of custom defined network flow rules is stored in a forwarding table on the edge router. A packet of data is received at the edge router. The packet of data is attributed to the customer network. The set of custom defined network flow rules is applied to the pack of data using the forwarding table.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Telecommunications networks generally comprise nodes, such as routers, switches, gateways, and other network components for transporting data through networks. Network nodes typically have an Internet Protocol (IP) address describing the destination of the node and a path to the node. When a packet of data is sent over a telecommunications network, the packet is routed based on information contained in the packet and a routing table listing routes to particular network nodes. The packet includes a header detailing: a destination address (i.e., an address of the node the packet is being sent to), a source address (i.e., an address of the node the packet is being sent from), and a protocol type (e.g., TCP, UTP, HTTP, FTP, etc.). Using this information, a routing table is consulted to identify the IP address for the destination node, and the packet of data is forwarded to the destination node based on forwarding protocols.

To control and direct network traffic flow, many telecommunications networks utilize Multiprotocol Label Switching (MPLS). Generally, MLS directs data from one network node to another based on short path labels rather than long network addresses, thereby avoiding complex lookups in a routing table. The labels identify virtual links (paths) between distant network nodes rather than endpoints. MPLS can encapsulate packets of various network protocols and work in conjunction with Internet Protocol (IP) routing protocols. As such, in an IP/MPLS network, network traffic is forward based on more considerations than just shortest path. For example, the shortest path may be congested, so the shortest path having available bandwidth may be selected.

Software-defined networking (SDN) takes this a step further to provide centrally managed, high performance policy routing. In particular, SDN forwards packets of data using custom-built exceptions to the standard IP/MPLS forwarding. Generally, aspects of the present disclosure involve systems and methods for providing customer defined forwarding modifications. In some aspects, a customer portal is provided for a customer to define rules for forwarding packets of data using custom-built exceptions to standard IP/MPLS forwarding, thereby effectively extending the customer network edge into the provider network edge. The customer defines forwarding modifications using the customer portal. The customer defined forwarding modifications are pushed to the edge of the telecommunication provider network, which may be, for example, an IP network or Virtual Private Network (VPN). The modifications may include various rules, including, without limitation, re-mark, rate limit, drop packets, and/or the like. Pushing the modifications to the edge of the telecommunication provider network effectively extends the customer network's service reach across the geographic span of the telecommunication provider network.

Figure 1:
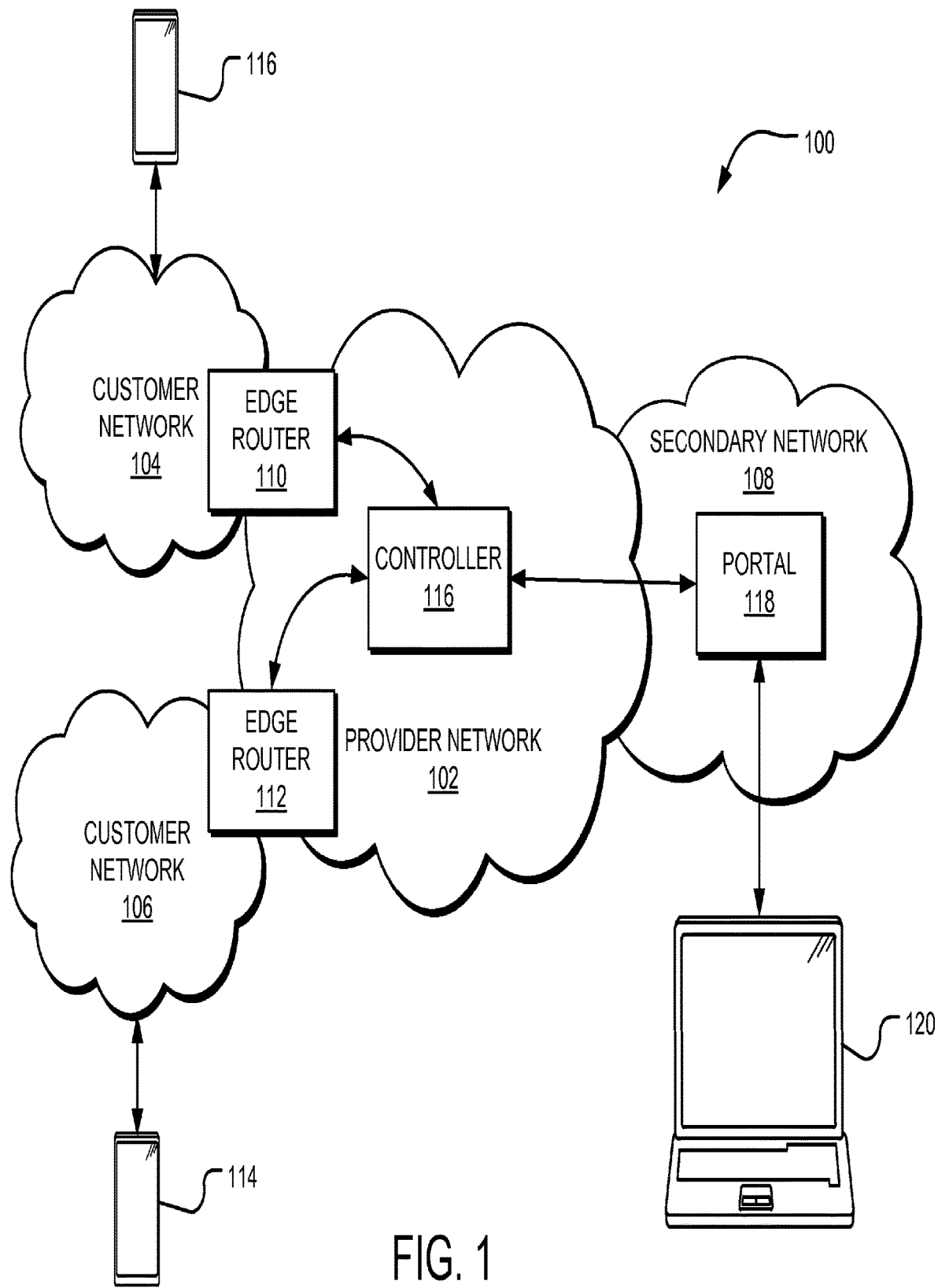
FIG. 1 is an example software-defined network environment providing centrally managed, high performance policy routing customized for a customer network.

For a detailed description of an example SDN environment 100 providing centrally managed, high performance policy routing customized for a customer network, reference is made to FIG. 1. In one implementation, a provider network 102 is in communication with various other networks (e.g., networks 104-108) to provide telecommunications services to end users. The provider network 102 is a telecommunications provider that facilitates communication and exchanges traffic between the various networks to provide the telecommunications services. In one implementation, the provider network 102 is a large Internet Service Provider (ISP) maintaining a network with a backbone stretching over a large geographical region, such as the United States. The other various networks in communication with the provider network 102, including customer networks 104, 106 and secondary network 108, may be wired or wireless networks under the control of or operated/maintained by one or more entities, such as an ISP or Mobile Network Operator (MNO), that provide access to the provider network 102 to end users for receiving telecommunications services. Thus, for example, the customer networks 104, 106 may be clients of the provider network 102 for providing Internet access to one or more end users via the provider network 102. Although two customer networks and one secondary network are shown in the network environment 100, more or fewer customer and/or secondary networks may interface with the primary network 102. Furthermore, the secondary network 108 may be part of or separate from the provider network 102 and/or the customer network 104 or 106.

The primary network 102 includes numerous network components, including, but not limited to, gateway routers, servers, registrars, and the like, that enable the transmission of data across the networks 102-108. For example, the primary network 102 includes multiple ingress/egress routers (e.g. edge routers 110, 112) in communication with the customer networks 104, 106. One or more end users may connect to the Internet with a user device 114, 116 via the customer networks 104, 106. The user devices 114, 116 may be any form of computing device, including, without limitation, a personal computer, a terminal, a workstation, a mobile phone, a mobile device, a tablet, a set top box, a multimedia console, a television, and/or the like. In some implementations, the edge routers 110, 112 communicate with each other across the primary network 102 over multiple iterations and hops of other routers contained within the primary network 102. Similarly, the customer networks 104, 106 and/or the secondary network 108 may include edge routers that communicate with other routers via one or more hops and interface with another network, gateway, end user, or the like.

The networks 102-108 exchange network traffic using a routing protocol. The routing protocol specifies how the edge routers 110, 112 communicate and select routes between network nodes. The edge routers 110, 112 each include a forwarding table generated based on routing protocols to direct a packet of data to a destination node along a path. In one implementation, the provider network 102 includes a controller 116 to customize the routing protocols using SDN. The controller 116 includes open application programming interface (API) services, such as OpenFlow, to program network devices, such as the edge routers 110, 112 to forward packets of data based on modified forwarding rules.

In one implementation, the secondary network 108 includes a portal 118 in communication with the controller 116 for defining forwarding modifications using a user device 120. The user device 120 may be any form of computing device, including, without limitation, a personal computer, a terminal, a workstation, a mobile phone, a mobile device, a tablet, a set top box, a multimedia console, a television, and/or the like. In one implementation, the portal 118 is utilized by an operator of the customer network 104 to define forwarding modifications for traffic transceived over the provider network 102 for the customer network 104. The modifications may include, without limitation, rules to re-mark, rate limit, drop packets, filter, and/or the like based on properties of a packet of data (e.g., source, destination, POS type, etc.). The portal 118 communicates with the controller 116 to generate or modify a forwarding table based on the forwarding modifications, and the controller 116 pushes the forwarding table modifications to the edge routers 110, 112.

When a packet of data is received at an edge router 110, 112 of the provider network 102, the packet header is compared to the forwarding table to match forwarding rules and forward the packet of data based on the matched rules. Stated differently, the packet header is compared to each of the rules in order to identify any rules that apply to the packet of data. The packet of data is forwarded based on the first matched rule. If no rules apply, the packet of data is forwarded based on default forwarding rules, which may be destination based forwarding, as described herein. Unless the packet is dropped based on a forwarding rule, the packet is backhauled across the provider network 102 to its demarc based on the forwarding modifications. The demarc is the point at which the packet of data egresses from the provider network 102 and is carried the last mile by the customer network 104 to the destination.

Pushing the forwarding modifications to the edge routers 110, 112 of the provider network 102, rather than just applying the modifications within the customer network 104, effectively extends the edge of the customer network 104 across the geographic span of the provider network 102, thereby preventing the provider network 102 from backhauling packets of data across the provider network 102 to their demarc before being dropped or modified.

Figure 2:
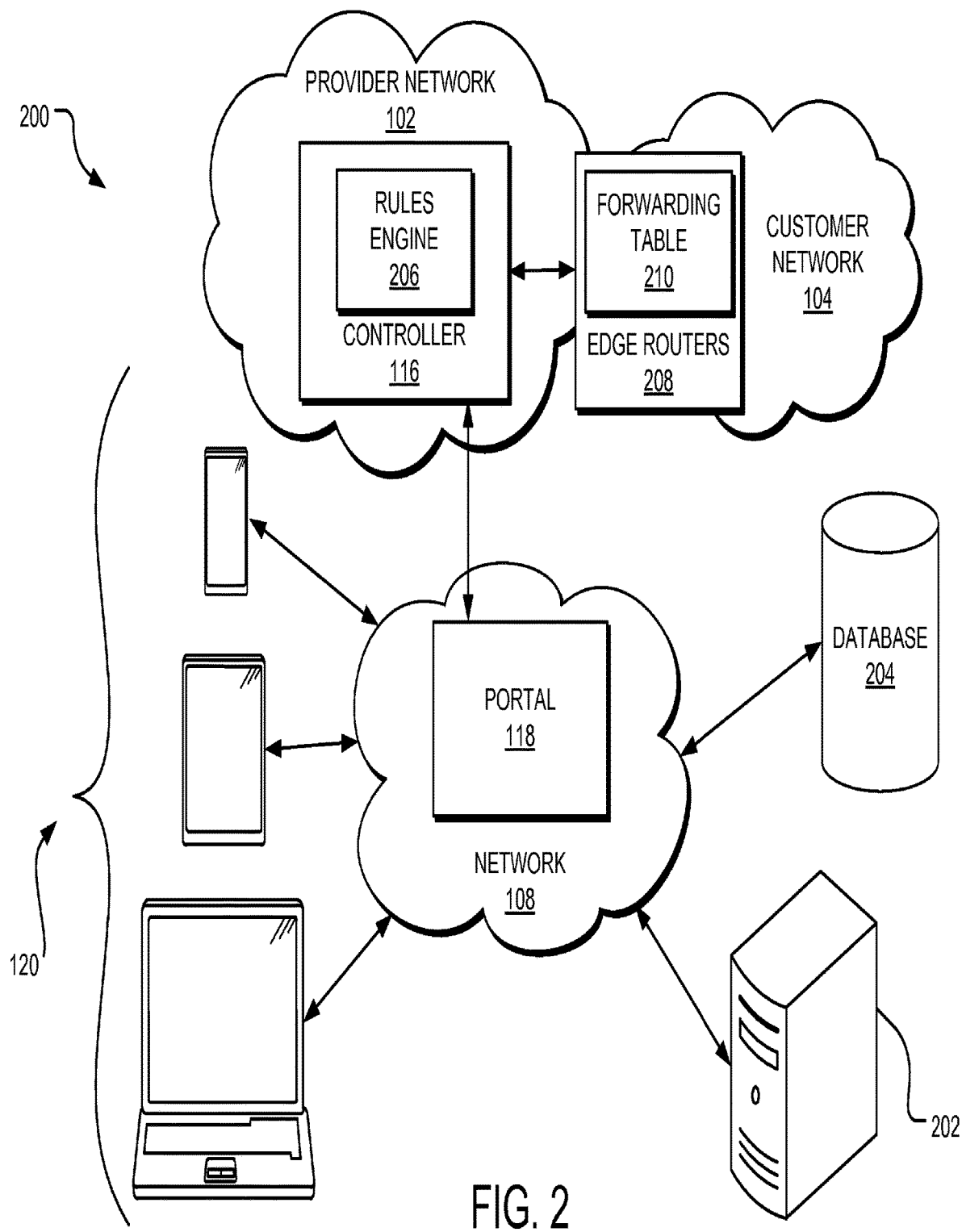
FIG. 2 is an example network environment, including a customer portal running on a server or other computing device coupled with a network, for custom-defining forwarding modifications for a customer network.

Turning to FIG. 2, an example network environment 200 for custom-defining forwarding modifications for the customer network 104. In one implementation, a user associated with the customer network 104 accesses and interacts with the portal 118 using the user device 120 to custom define forwarding modifications for the customer network 104 via the secondary network 108 (e.g., the Internet). The secondary network 108 may be the same as or separate from the customer network 104. The user may be any personnel authorized to make modifications to the forwarding policies for network traffic for the customer network 104, including, for example, personnel involved with the operation of the customer network 104.

The secondary network 108 is used by one or more computing or data storage devices (e.g., one or more databases 204 or other computing units described herein) for implementing the portal 18 and other services, applications, or modules in the network environment 200.

In one implementation, the secondary network 108 includes at least one server 202 hosting a website or an application that the user may visit to access the portal 118 and/or other network components. The server 202 may be a single server, a plurality of servers with each such server being a physical server or a virtual machine, or a collection of both physical servers and virtual machines. In another implementation, a cloud hosts one or more components of the network environment 200. The user devices 120, the server 202, and other resources connected to the secondary network 108 may access one or more other servers to access to one or more websites, applications, web services interfaces, storage devices, computing devices, or the like that are used for custom-defining forwarding modifications. The server 202 may also host a search engine that the portal 118 uses for accessing, searching for, and modifying forwarding policies and other data.

As can be understood from FIG. 2, the portal 118 provides a customer interface for controlling network flow for the customer network 104. The user defines one or more forwarding modifications using the portal 118. In one implementation, the modifications are analyzed by the provider network 102 automatically or manually by a representative of the provider network 102 to confirm that the modifications are valid and operable within the network environment 200. The provider network 102 may automatically analyze the modifications based on a set of internal rules. For example, the modifications may specify that all packets of data for a particular webserver be dropped, and the internal rules may confirm that it is an acceptable command for the customer to drop all packets to that webserver. The portal 118 sends the modifications to the controller 116, which then distributes the forwarding rules to one or more of edge routers 208 in the provider network 102. Thus, next time a packet of data arrives at one of the edge routers 208 specifying the webserver as the destination, the packet of data is dropped at the edge router 208.

In one implementation, the portal 118 may be used to specify which of the edge routers 208 to apply the forwarding modifications. For example, the portal 118 may be used to specify that the packet of data for the webserver is only dropped when it is received at an edge router 208 in Europe. Further, forwarding policies may be modified based on various properties of the packet of data. Packets of data include headers with information about the intentions of the packet of data, including, the source and destination addresses of the packet and a protocol type. The packet of data further includes quality of service bits that define additional properties of the packet to define the route, priority, and the like. For example, low latency is important for voice packets and less important for web-based packets. As such, voice packets may be forwarded along a shortest path to traverse the networks as efficiently as possible and be prioritized over the web-based packets and other less important packets of data, such that contention resolution favors the voice packets. Similarly, the forwarding modifications may specify that important or high priority data is forwarded along one route while bulk data is forwarded along another path. For example, voice data may be forwarded north, and bulk data may be forwarded south.

As such, the portal 118 may be used to define forwarding policies to apply to packets of data and a myriad of rules to manage those policies. For example, the forwarding policies may include, without limitation, drop, demarc, rate limit, queue selection, path selection, and the like. The portal 118 permits the customer to apply forwarding rules to the provider network 102 that otherwise would have been limited to the customer network 104, thereby applying the policies more extensively and effectively extending the edge of the customer network 104.

The portal 118 permits a customer to manage routing policies in an intuitive and interactive way at various levels of granularity. For example, the portal 118 may be used to define a range of IP addresses to which to apply a rule, a type of packets to which to apply a rule, and a set of selectable forwarding rules. The set of selectable forwarding rules may be defined based on internal rules of the provider network 102 to ensure that the rules are viable.

In one implementation, the portal 118 identifies the customer network 104 based on login information provided by the user, thereby restricting the packets of data for which the user may define forwarding rules. By restricting the packets of data based on the customer, the portal 118 ensures that customers cannot modify forwarding rules for packets of data for other customer networks. As such, the portal 118 accesses a list of IP addresses relating to the customer network 104 and a set of viable or otherwise authorized forwarding rules for the customer network 104 for selection by the customer. The various forwarding rules are provided to the controller 116, which then uses a rules engine 206 to use customer identification, network addresses, and permissions to modify forwarding tables 210 on selected edge routers 208. The forwarding tables 210 are then used to apply forwarding policies based on customer defined criteria to the network traffic of the applicable customer only. Based on the source or destination address, a packet of data may be attributed to a particular customer, and the forwarding policies for that customer may then be applied to that packet of data. Similarly, packets of data being transmitted using a particular ISP through a specific gateway, packets of data within geographic limits tied to specific ingress/egress points, and the like may be used to attribute packets of data to a particular customer.

As described herein, the portal 118 may be used to effectively extend the service reach of the customer network 104 across the geographic span of the provider network 102 by distributing the forwarding tables 210 across one or more of the edge routers 208 of the provider network 102. As such, packets of data may be dropped, demarced, or otherwise modified at any of selected routers in the provider network 102, not just at edge routers 208. As such, the provider network 102 does not have to backhaul packets of data across the provider network 102 only to have them dropped or otherwise modified in the customer network 104.

In one implementation, the portal 118 tracks the application of forwarding modifications by customers that drop packets of data at the edge of the provider network 102 rather than having the provider network 102 backhaul the packets of data to be dropped at the edge of the customer network 104. The provider network 102 may use the tracked data to provide incentives, including financial incentives to the customer network 104.

Figure 3:
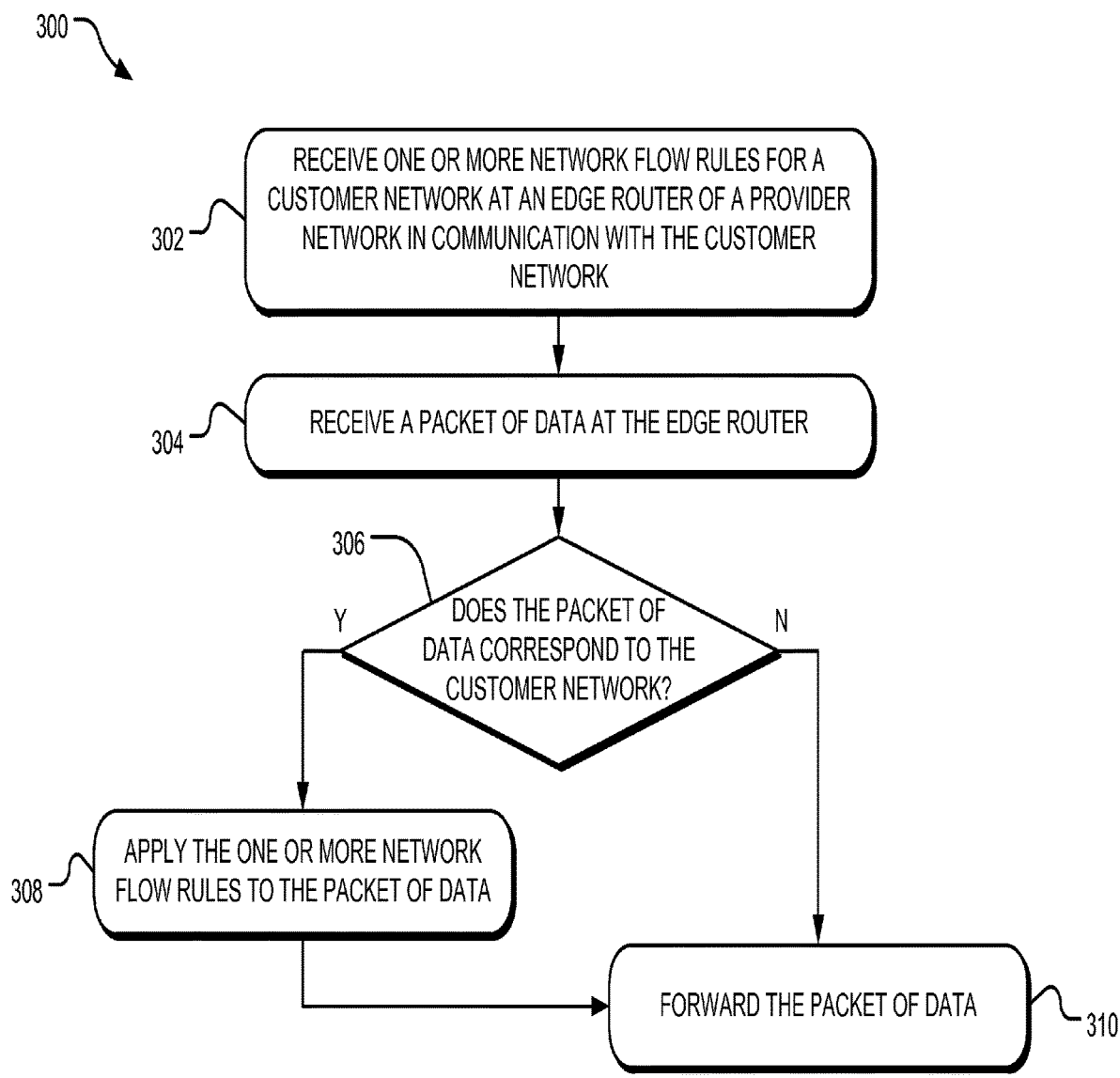
FIG. 3 illustrates example operations for forwarding data packets based on routing policies customized for a customer network.

FIG. 3 illustrates example operations 300 for forwarding data packets based on routing policies customized for a customer network. In one implementation, an operation 302 receives one or more network flow rules for a customer network at an edge router of a provider network. A customer network is in communication with the provider network. The network flow rules are stored in a forwarding table.

An operation 304 receives a packet of data at the edge router, and an operation 306 determines whether the packet of data corresponds to the customer network. If the packet of data corresponds to the customer network, an operation 308 applies the one or more network flow rules to the packet of data, and an operation 310 forwards the packet of data based on the network flow rules. If the data does not correspond to the customer network, the operation 308 forwards the packet of data based on default forwarding rules, such as destination forwarding or based on network flow rules for another customer, if applicable.

Figure 4:
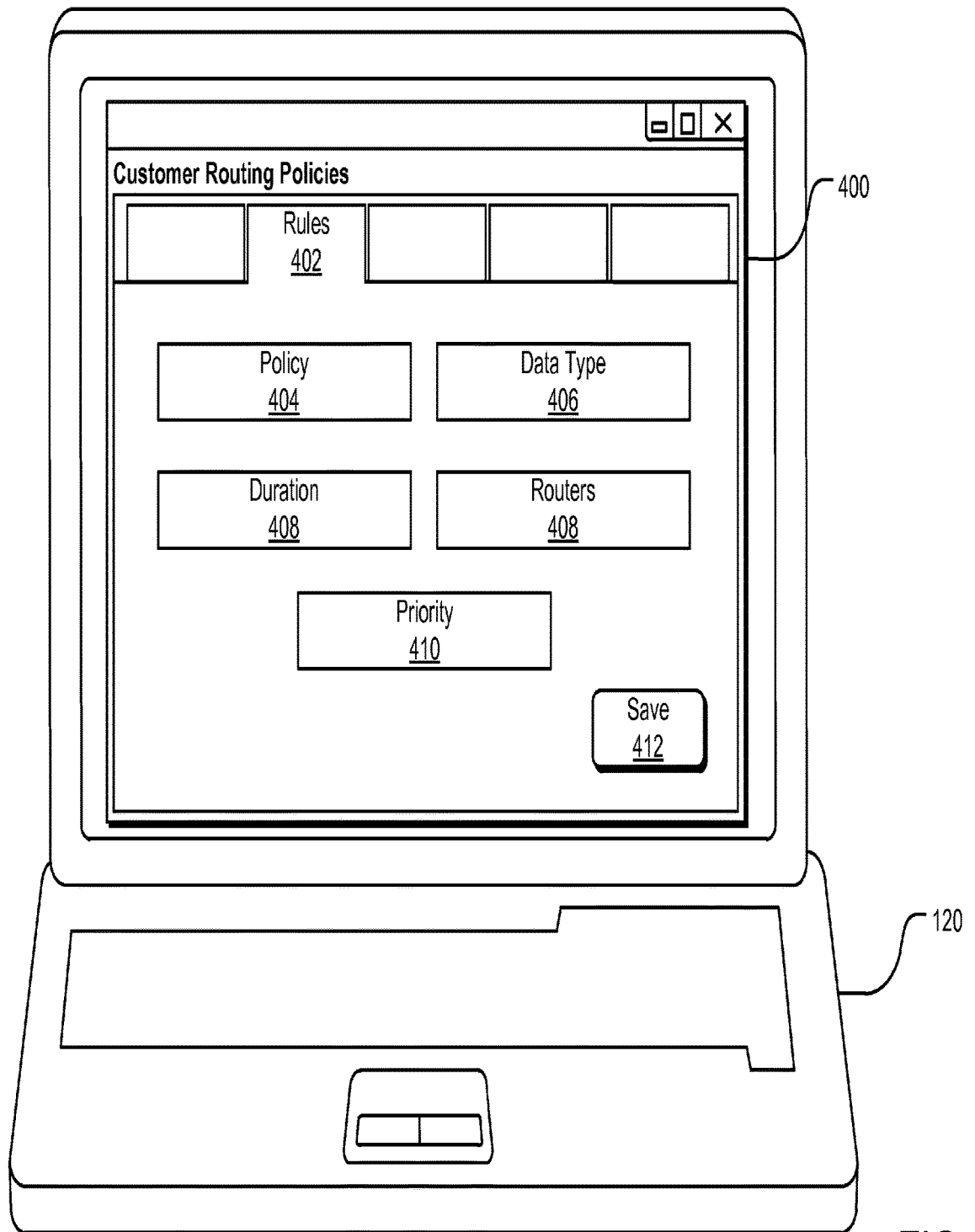
FIG. 4 illustrates an example customer routing policies user interface for defining one or more routing policies for a customer network.

FIG. 4 shows an example user interface generated by the portal 118 and displayed in a browser window of the user device 120 through which access to and interactions with the forwarding rules are provided. It will be appreciated by those skilled in the art that such depictions are exemplary only and not intended to be limiting. An example customer routing policies user interface 400 for defining one or more routing policies for a customer network is shown in FIG. 4.

In one implementation, the user interface 400 includes a rules tab 402 for custom defining forwarding rules for a customer network. In one implementation, the rules includes fields 404-410 for custom defining forwarding rules. A policy field 404 may be used to select or otherwise define a forwarding rule. In one implementation, the policy field 404 includes a prepopulated list of viable or otherwise authorized forwarding policies for the customer defined based on internal rules of the provider network. The set of selectable policies may include, without limitation, drop, demarc, rate limit, queue selection, path selection, and the like. A data type field 406 may be used to select a type of packet of data (e.g., voice, web, etc.) to which to apply the policy input in the policy field 404. A duration field 408 may be used to define a duration of the policy and when the policy expires. For example, during a heavy and important broadcast, a customer network may drop all other packets of data to keep the bandwidth open during the broadcast. A routers field 410 may be used to define the routers in the provider network to which the policies will be pushed. For example, there may be an option for every edge in the provider network, geographical regions, specific portals (everything coming from a specific ISP or MSO), northside of the last mile (outbound from the provider network to the customer network), and the like. A priority field 410 may be used to define a priority of the policy compared to existing policies to address any conflicting policies.

In one implementation, the portal sets all applicable rules in bulk and overwrites any other previously existing rules. In another implementation, the portal receives rules and integrates the rules into the previously existing rules. In this case, the portal detects and removed redundancies and detects conflicting rules, which are presented to the user for prioritization.

Figure 5:
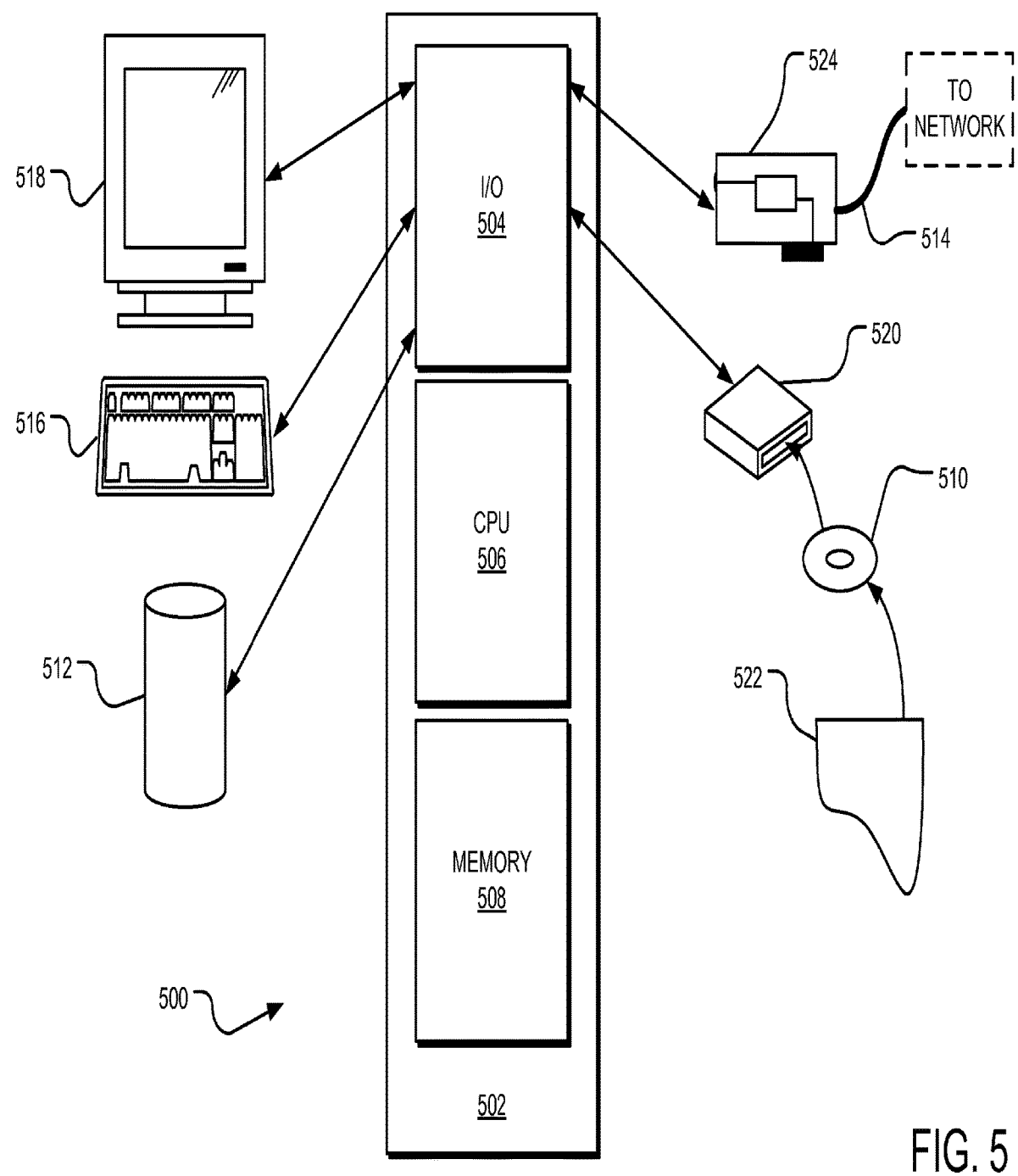
FIG. 5 is an example computing system that may be specifically configured to implement the various systems and methods discussed herein.

Referring to FIG. 5, a detailed description of an example computing system 500 having one or more computing units that may implement various systems and methods discussed herein is provided. The computing system 500 may be applicable to the user devices 114, 116, and 120, the server 202, and/or other network components and computing devices. It will be appreciated that specific implementations of these devices may be of differing possible specific computing architectures not all of which are specifically discussed herein but will be understood by those of ordinary skill in the art.

The computer system 500 may be a general computing system is capable of executing a computer program product to execute a computer process. Data and program files may be input to the computer system 500, which reads the files and executes the programs therein. Some of the elements of a general purpose computer system 500 are shown in FIG. 5 wherein a processor 502 is shown having an input/output (I/O) section 504, a Central Processing Unit (CPU) 506, and a memory section 508. There may be one or more processors 502, such that the processor 502 of the computer system 500 comprises a single central-processing unit 506, or a plurality of processing units, commonly referred to as a parallel processing environment. The computer system 500 may be a conventional computer, a distributed computer, or any other type of computer, such as one or more external computers made available via a cloud computing architecture. The presently described technology is optionally implemented in software devices loaded in memory 508, stored on a configured DVD/CD-ROM 410 or storage unit 512, and/or communicated via a wired or wireless network link 514, thereby transforming the computer system 500 in FIG. 5 to a special purpose machine for implementing the described operations.

The I/O section 504 is connected to one or more user-interface devices (e.g., a keyboard 516 and a display unit 518), a disc storage unit 512, and a disc drive unit 520. In the case of a tablet device, the input may be through a touch screen, voice commands, and/or Bluetooth connected keyboard, among other input mechanisms. Generally, the disc drive unit 520 is a DVD/CD-ROM drive unit capable of reading the DVD/CD-ROM medium 510, which typically contains programs and data 522. Computer program products containing mechanisms to effectuate the systems and methods in accordance with the presently described technology may reside in the memory section 504, on a disc storage unit 512, on the DVD/CD-ROM medium 510 of the computer system 500, or on external storage devices made available via a cloud computing architecture with such computer program products, including one or more database management products, web server products, application server products, and/or other additional software components. Alternatively, a disc drive unit 520 may be replaced or supplemented by an optical drive unit, a flash drive unit, magnetic drive unit, or other storage medium drive unit. Similarly, the disc drive unit 520 may be replaced or supplemented with random access memory (RAM), magnetic memory, optical memory, and/or various other possible forms of semiconductor based memories commonly found in smart phones and tablets.

The network adapter 524 is capable of connecting the computer system 500 to a network via the network link 514, through which the computer system can receive instructions and data. Examples of such systems include personal computers, Intel or PowerPC-based computing systems, AMD-based computing systems and other systems running a Windows-based, a UNIX-based, or other operating system.

It should be understood that computing systems may also embody devices such as terminals, workstations, mobile phones, tablets, laptops, personal computers, multimedia consoles, gaming consoles, set top boxes, and the like.

When used in a LAN-networking environment, the computer system 500 is connected (by wired connection or wirelessly) to a local network through the network interface or adapter 524, which is one type of communications device. When used in a WAN-networking environment, the computer system 500 typically includes a modem, a network adapter, or any other type of communications device for establishing communications over the wide area network. In a networked environment, program modules depicted relative to the computer system 500 or portions thereof, may be stored in a remote memory storage device. It is appreciated that the network connections shown are examples of communications devices for and other means of establishing a communications link between the computers may be used.

In an example implementation, network forwarding policies and attributes, the portal 118, a plurality of internal and external databases (e.g., the database 204), source databases, and/or data cache on cloud servers are stored as the memory 508 or other storage systems, such as the disk storage unit 512 or the DVD/CD-ROM medium 510, and/or other external storage devices made available and accessible via a cloud computing architecture. Software defined networking operations and other modules and services may be embodied by instructions stored on such storage systems and executed by the processor 502.

Some or all of the operations described herein may be performed by the processor 502. Further, local computing systems, remote data sources and/or services, and other associated logic represent firmware, hardware, and/or software configured to control operations of the systems 100-200. Such services may be implemented using a general purpose computer and specialized software (such as a server executing service software), a special purpose computing system and specialized software (such as a mobile device or network appliance executing service software), or other computing configurations. In addition, one or more functionalities of the systems 100-200 disclosed herein may be generated by the processor 502 and a user may interact with a Graphical User Interface (GUI) using one or more user-interface devices (e.g., the keyboard 516, the display unit 518, and the user devices 120) with some of the data in use directly coming from online sources and data stores. The system set forth in FIG. 5 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular examples. Functionality may be separated or combined in blocks differently in various implementations of the disclosure or described with different terminology. These and other variations, modifications, additions, and improvements may fall within the scope of the disclosure as defined in the claims that follow.

What is claimed is:

1. A method for custom-defined network routing, the method comprising:
    receiving, at a primary network, authentication information;
    identifying, based on the authentication information, a customer network, the customer network distinct from, and in communication with, the primary network;
    receiving a set of custom defined network flow rules at an edge router of the primary network, the set of custom defined network flow rules specific to network traffic transceived with the customer network, wherein at least a first rule of the set of custom defined network flow rules defines a priority for application of the first rule in case the first rule conflicts with another rule of the custom defined set of rules to the network traffic;
    storing the set of custom defined network flow rules in a forwarding table specific to the customer network on the edge router;
    receiving a packet of data at the edge router;
    attributing the packet of data to the customer network; and
    applying the set of custom defined network flow rules to the packet of data using the forwarding table,
    wherein each of the custom defined set of rules defines a duration for application of the custom defined set of rules to the network traffic at the at least one edge router.

2. The method as recited in claim 1, wherein the set of custom defined network flow rules is distributed to the edge network by a controller of the primary network.

3. The method as recited in claim 1, wherein the packet of data includes a header and the packet of data is attributed to the customer network using the header.

4. The method as recited in claim 3, wherein the packet of data is attributed to the customer network using at least one of: a source address or a destination address specified in the header.

5. The method as recited in claim 1, wherein the set of custom defined network flow rules includes one or more of: drop, demarc, rate limit, queue selection, and path selection.

6. The method as recited in claim 1, wherein each of the set of custom defined network flow rules defines for application to the network traffic.

* * * * *